United States Patent
Herzog et al.

(10) Patent No.: US 10,150,505 B2
(45) Date of Patent: Dec. 11, 2018

(54) AUTOMATED HITCHING ASSIST SYSTEM

(71) Applicant: Continental Automotive Systems, Inc., Auburn Hills, MI (US)

(72) Inventors: Brandon Herzog, Waterford, MI (US); Hao Sun, Auburn Hills, MI (US); Joyce Chen, West Bloomfield, MI (US); Ibro Muharemovic, Shelby Township, MI (US)

(73) Assignee: CONTINENTAL AUTOMOTIVE SYSTEMS, INC., Auburn Hills, MI (US)

( * ) Notice: Subject to any disclaimer, the term of this patent is extended or adjusted under 35 U.S.C. 154(b) by 11 days.

(21) Appl. No.: 15/095,202

(22) Filed: Apr. 11, 2016

(65) Prior Publication Data
US 2016/0304122 A1 Oct. 20, 2016

Related U.S. Application Data

(60) Provisional application No. 62/147,303, filed on Apr. 14, 2015.

(51) Int. Cl.
*B62D 13/06* (2006.01)
*B62D 13/00* (2006.01)
(Continued)

(52) U.S. Cl.
CPC .............. *B62D 13/005* (2013.01); *B60D 1/36* (2013.01); *B60D 1/62* (2013.01); *B60G 17/0155* (2013.01);
(Continued)

(58) Field of Classification Search
CPC .............. B62D 13/00; B62D 6/00; B60D 1/36
(Continued)

(56) References Cited

U.S. PATENT DOCUMENTS 5,191,328 A * 3/1993 Nelson ..................... B60D 1/36 250/491.1
5,970,619 A * 10/1999 Wells ....................... B60D 1/36 33/264
(Continued)

FOREIGN PATENT DOCUMENTS

CN 104159757 A 11/2014
GB 2513393 A 10/2014
(Continued)

OTHER PUBLICATIONS

Japanese Office Action dated Apr. 3, 2017 for corresponding application 2016-080697.
(Continued)

*Primary Examiner* — Thomas G Black
*Assistant Examiner* — Wae L Louie

(57) ABSTRACT

A hitch assist system for a vehicle comprises a camera mounted to view a reverse path of a vehicle, an input device connected for the hitch assist system, and a controller. The controller includes instructions for detecting a trailer proximate to a vehicle with the camera, determining a vehicle hitch ball location, determining a trailer hitch location, and calculating a vehicle path from an initial position to a final position. The vehicle hitch ball is laterally aligned with the trailer hitch in the final position. The controller also includes instructions for calculating the steering and braking maneuvers necessary to move the vehicle along the path to the final position and sending instructions to a vehicle steering system and a vehicle brake system to perform the calculated maneuvers.

18 Claims, 4 Drawing Sheets

(51) Int. Cl.
  *B60D 1/36* (2006.01)
  *B60D 1/62* (2006.01)
  *B60G 17/015* (2006.01)
  *B60R 1/00* (2006.01)
  *B60R 11/04* (2006.01)
  *B60W 30/09* (2012.01)
  *B62D 15/02* (2006.01)
  *G06K 9/00* (2006.01)

(52) U.S. Cl.
  CPC .............. *B60R 1/003* (2013.01); *B60R 11/04* (2013.01); *B60W 30/09* (2013.01); *B62D 15/0265* (2013.01); *B62D 15/0295* (2013.01); *G06K 9/00791* (2013.01); *B60G 2800/01* (2013.01); *B60R 2300/301* (2013.01); *B60R 2300/808* (2013.01); *B60W 2420/42* (2013.01); *B60W 2550/10* (2013.01)

(58) Field of Classification Search
  USPC .............. 701/25, 41; 280/477, 479.1, 479.3; 348/148
  See application file for complete search history.

(56) References Cited

U.S. PATENT DOCUMENTS

| | | | | |
|---|---|---|---|---|
| 7,195,267 B1 * | 3/2007 | Thompson | ............... | B60D 1/36 280/477 |
| 7,777,615 B2 * | 8/2010 | Okuda | ..................... | B60D 1/36 280/477 |
| 8,798,842 B2 * | 8/2014 | Woolf | ...................... | B60D 1/36 280/479.1 |
| 9,290,204 B2 * | 3/2016 | Lavoie | ................... | B62D 13/06 |
| 9,403,413 B2 * | 8/2016 | Talty | ........................ | B60D 1/36 |
| 9,511,799 B2 * | 12/2016 | Lavoie | .............. | B62D 15/0275 |
| 9,555,832 B2 * | 1/2017 | Smit | ...................... | B62D 13/06 |
| 9,566,911 B2 * | 2/2017 | Greenwood | .............. | B60R 1/00 |
| 9,592,851 B2 * | 3/2017 | Lavoie | ................... | B62D 13/06 |
| 9,607,242 B2 * | 3/2017 | Lavoie | ................... | B62D 13/00 |
| 9,610,975 B1 * | 4/2017 | Hu | ......................... | B62D 13/06 |
| 9,683,848 B2 * | 6/2017 | Lavoie | ................. | G01C 21/165 |
| 9,696,723 B2 * | 7/2017 | Zeng | ..................... | G05D 1/0246 |
| 2002/0145662 A1 * | 10/2002 | Mizusawa | ................ | B60D 1/36 348/118 |
| 2005/0046147 A1 * | 3/2005 | Piper | ........................ | B60D 1/36 280/477 |
| 2006/0255560 A1 * | 11/2006 | Dietz | ........................ | B60D 1/36 280/477 |
| 2009/0236825 A1 * | 9/2009 | Okuda | ..................... | B60D 1/36 280/477 |
| 2015/0321666 A1 * | 11/2015 | Talty | ........................ | B60D 1/62 701/41 |
| 2016/0304122 A1 * | 10/2016 | Herzog | .................... | B60D 1/36 |
| 2017/0188505 A1 * | 7/2017 | Potier | .................. | A01B 69/003 |
| 2017/0217372 A1 * | 8/2017 | Lu | ........................... | B60R 1/003 |
| 2017/0240204 A1 * | 8/2017 | Raad | .................... | B62D 15/025 |

FOREIGN PATENT DOCUMENTS

| | | |
|---|---|---|
| JP | 2004230947 A | 8/2004 |
| JP | 2005010893 A | 8/2004 |
| JP | 2005112004 A | 4/2005 |
| JP | 2002036908 A | 11/2014 |

OTHER PUBLICATIONS

Chinese Office Action dated Jan. 25, 2018 for corresponding Chinese patent application No. 201610347437.1.
Japanese Office Action dated Feb. 19, 2018 for corresponding Japanese patent application No. 2016-080967.
Japanese Office Action dated Aug. 6, 2018 for corresponding Japanese patent application No. 2016-080967.

* cited by examiner

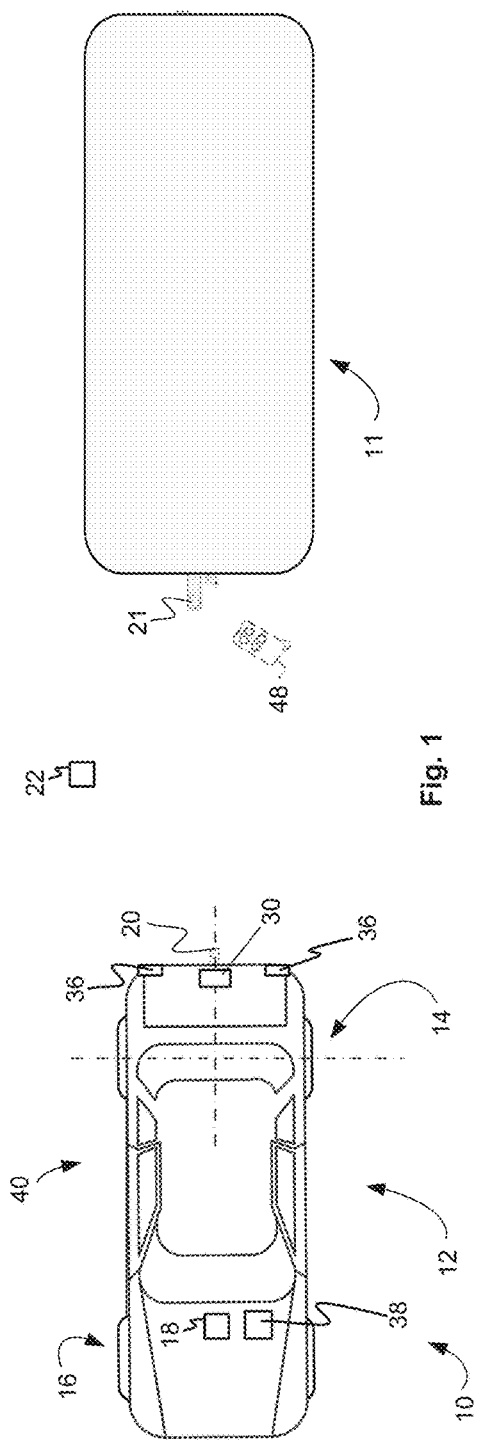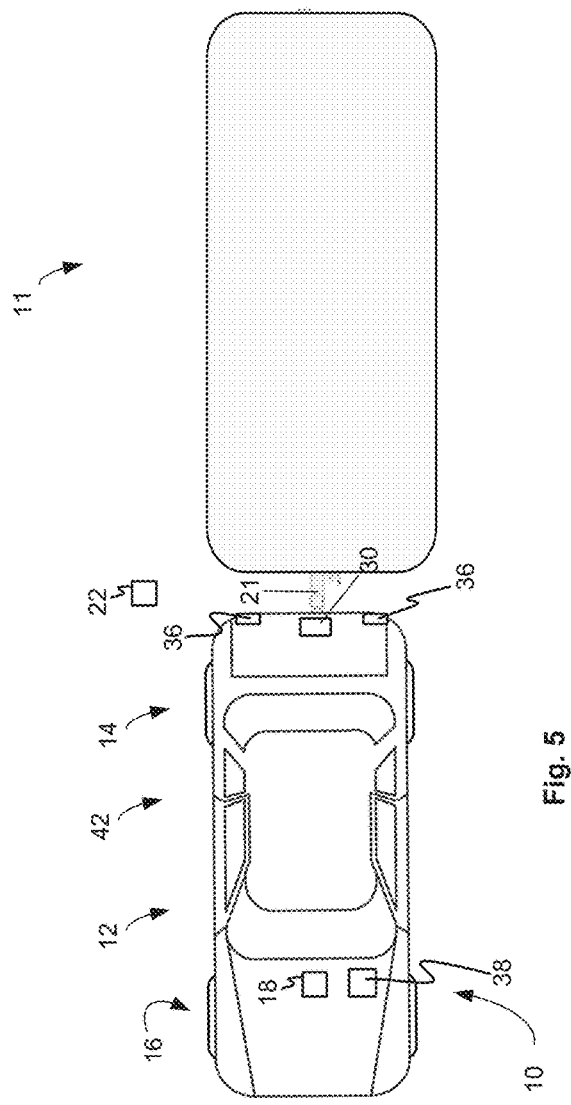

AUTOMATED HITCHING ASSIST SYSTEM

CROSS REFERENCE TO RELATED APPLICATION

This application claims priority to U.S. Provisional Application No. 62/063,116 filed on Apr. 14, 2015.

TECHNICAL FIELD

The present disclosure relates to automotive vehicles, and more particularly to driver assistance systems for automotive vehicles.

BACKGROUND

Advancements in sensor technology available have led to the ability to improve safety systems for vehicles. Arrangements and methods for detecting and avoiding collisions are becoming available. Such driver assistance systems use sensors located on the vehicle to detect an oncoming collision. The systems may warn the driver of various driving situations to prevent or minimize collisions. Additionally, sensors and cameras are also used to alert the driver of possible obstacles when the vehicle is traveling in reverse. Such systems are especially useful for increasing safety in vehicles which operate under autonomous or semi-autonomous conditions.

Attaching a vehicle to a trailer requires multiple persons one to control the vehicle and the other to view the vehicle and trailer and provide direction regarding the path the vehicle to align with the hitch. Additionally, those unaccustomed to hitching a vehicle to a trailer may have some difficulty in providing efficient instructions for directing the path of the vehicle.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method of controlling a vehicle comprises initiating a trailer hitch assist system with an input device and detecting a trailer proximate to a vehicle with at least one sensor mounted to the vehicle. A vehicle hitch ball location and a trailer hitch location are determined. A vehicle path from an initial position to a final position is calculated with the controller, such that the vehicle hitch ball is laterally aligned with the trailer hitch in the final position. The controller calculates the steering and braking maneuvers necessary to move the vehicle along the path to the final position and sends instructions to a vehicle steering system and a vehicle brake system to perform the calculated maneuvers.

A hitch assist system for a vehicle comprises a camera mounted to view a reverse path of a vehicle, an input device connected for the hitch assist system, and a controller. The controller includes instructions for detecting a trailer proximate to a vehicle with the camera, determining a vehicle hitch ball location, determining a trailer hitch location, and calculating a vehicle path from an initial position to a final position. The vehicle hitch ball is laterally aligned with the trailer hitch in the final position. The controller also includes instructions for calculating the steering and braking maneuvers necessary to move the vehicle along the path to the final position and sending instructions to a vehicle steering system and a vehicle brake system to perform the calculated maneuvers.

A method of controlling a vehicle comprises providing an controller configured to provide signals for controlling the steerable wheels via a powered steering system operatively coupled to the steerable wheel, and providing a driver input device for receiving a directional input from the driver related to an intended direction of travel of the vehicle in reverse. A camera is provided for viewing a rear of the vehicle and an controller receives the directional input from the driver comprising the intended direction of travel of the vehicle. The controller then implements a command to the powered steering system to steer the wheels to correspond to the intended direction of travel of the vehicle.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1 is a schematic illustration of a top view of a vehicle having a disclosed hitch assist system;

FIG. 5 is a schematic illustration showing the vehicle after movement by the hitch assist system of FIGS. 1-4.

DETAILED DESCRIPTION

Figure 2:
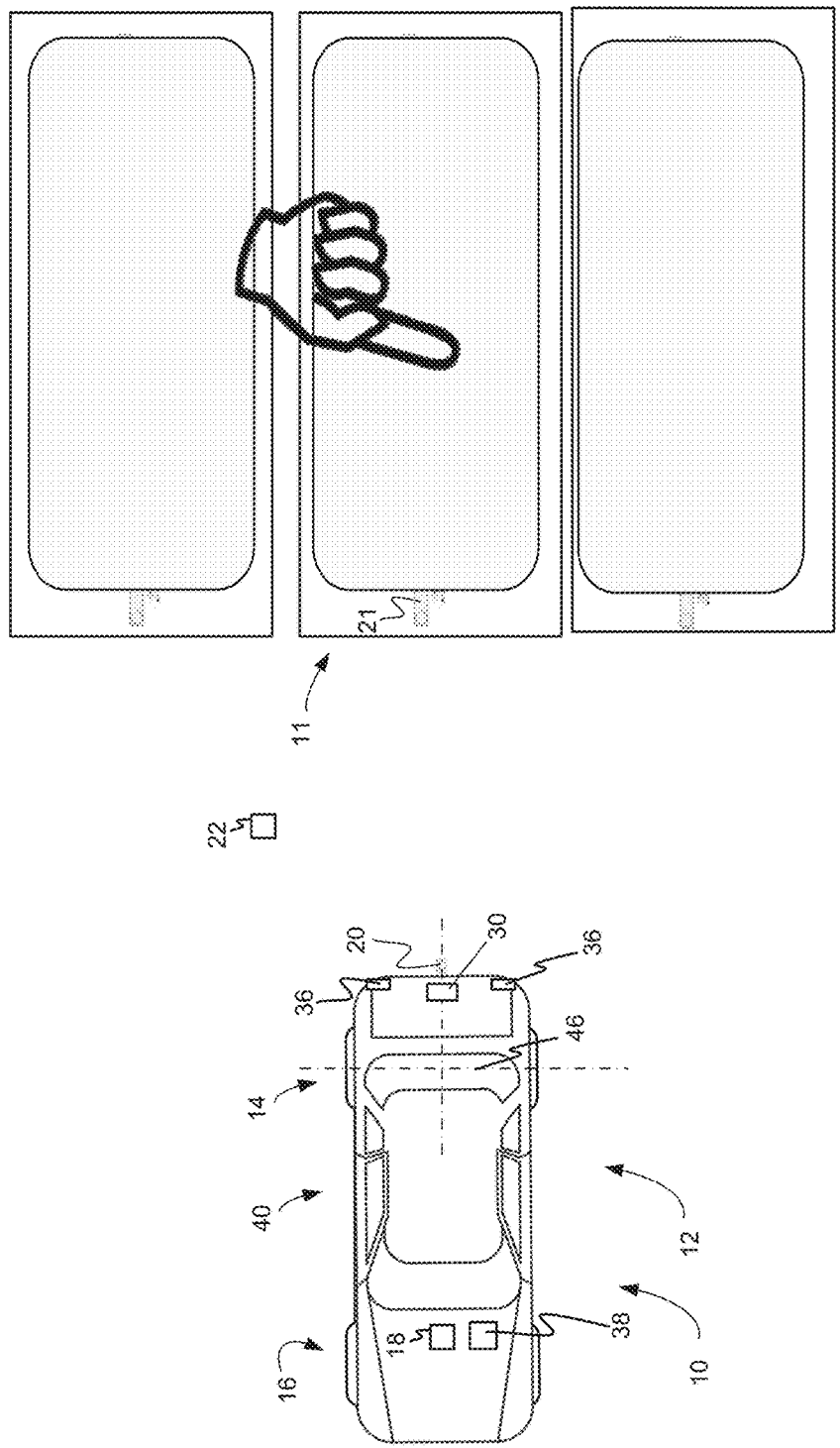
FIG. 2 is a schematic illustration showing a trailer selection stage for the hitch assist system of FIG. 1.

The following description is merely exemplary in nature and is in no way intended to limit the disclosure, its application, or uses. For purposes of clarity, the same reference numbers will be used in the drawings to identify similar elements.

Referring to FIGS. 1-4, a vehicle 10 including a driver assistance system, in particular a hitch assist system 12 is schematically shown. The hitch assist system 12 provides operates when the vehicle 10 is in reverse and is used to brake and steer the vehicle 10 to provide semi-autonomous or autonomous vehicle operation. Throughout the application the relative directions of forward and rear are in reference to the direction which an operator for the vehicle 10 would typically be facing when operating the vehicle 10 in a drive gear on a public road. Therefore, in operation of the hitch assist system 12 the vehicle 10 would be in a reverse gear and the operator may be facing backward.

The hitch assist system 12 may be used along with other vehicle systems, such as a suspension adjustment system 14, and an electronic brake system (EBS) 16. The hitch assist system 12 may also be included with a trailer backing assist system, which can be used to maneuver the vehicle 10 and trailer 11 combination after the trailer 11 is secured to the vehicle 10. A controller 18 for the hitch assist system 12 can be common with other vehicle systems 14, 16 and the trailer backing assist system or may be independent.

The hitch assist system 12 provides semi-autonomous and autonomous vehicle operation to move the vehicle 10 into the appropriate location to align the hitch ball 20 on the vehicle 10 with the hitch 21 of the trailer 11. When backing a vehicle 10 to a trailer 11 for hitching a vehicle operator typically needs another person to provide direction regarding the relative position between the vehicle 10 and trailer 11 and the movement needed to align the vehicle hitch ball 20 with the trailer hitch 21. The hitch assist system 12 allows a single operator to align the vehicle hitch ball 20 with the trailer hitch 21.

An input device 22 for to inputting commands to the hitch assist system 12 is provided. The input device may be HMI located in the vehicle 10 or may be provided in a device 22 that is wirelessly connected to the controller 18 to control of the vehicle 10 remotely. Thus, in one embodiment the hitch assist system 12 can be operated while outside the vehicle 10 and proximate to the vehicle 10 and trailer 11.

The hitch assist system 12 includes a camera 30 mounted to provide a view of a rear driving direction for the vehicle 10. The camera 30 may be a monocular camera, binocular camera, or another type of sensing device capable of providing a view of the rear travelling path of the vehicle 10. The camera 30 may be mounted in any location that provides a view of the rear driving path of the vehicle 10. The controller 18 may be connected to the camera 30 to analyze the image/data and identify objects 34, shown in FIG. 3, within the image that may be obstacles for the vehicle 10. Other cameras may also be mounted on the vehicle 10 to provide a view of the environment surrounding the vehicle 10. In addition to the camera 30, the hitch assist system 12 may use additional sensors 36 including, but are not limited to: proximity sensors, LIDAR, RADAR, ultrasound, GPS 38, radio sensors, etc. The sensors 36 may be able to detect objects that are located along side the vehicle 10, such as the object 34 illustrated in FIG. 3. These sensors may be added sensors or sensors already on the car and used by other systems, such a blind spot detection sensors.

In one embodiment, the hitch assist system 12 or another similar system 14 can determine a probability of collision when an object 34 is detected. If the probability of collision exceeds a predetermined threshold, the controller 18 indicates that at least one vehicle collision avoidance action is required. The required action can be in the form of a warning to the operator when an object is detected and/or the hitch assist system 12 or the other system 14 may be actuated to slow, stop, or steer the vehicle 10

Referring to FIG. 1, a vehicle 10 is parked proximate to the trailer 11. The vehicle 10 must be parked close enough to the trailer 11 for the camera 30 and other sensors 36 to detect the trailer 11 and provide the needed information. This distance may vary according to the type of camera 30 and sensors 36 that are used, for example the vehicle 10 may be parked within 15 meters of the trailer 11. The hitch assist system 12 maneuvers the vehicle 10 from the initial position 40 to the final position 42 (shown in FIG. 5). In the final position 42 the hitch ball 20 aligns with the trailer hitch 21.

The hitch assist system 12 may calculate the path 44 (shown in FIG. 4) the vehicle 10 will travel such that the vehicle 10 is in the same orientation at the initial position 40 and the final position 42. Therefore, the vehicle 10 should be aligned generally parallel with the trailer 11 at the initial position 40 and facing away from the trailer 11. Alternatively, the vehicle 10 is facing away from the trailer 11 and the hitch assist system 12 detects the initial orientation between the vehicle 10 and trailer 11 and calculates the path such that the vehicle 10 will be aligned in a generally axial manner in the final position 42. For example, the camera 30 may be a stereo camera and controller 18 may have instructions for performing image analysis and determining trailer orientation using relative distances between multiple measured locations on the trailer 11, e.g. trailer edges, hitch 21, etc. The controller 18 may also be able to calculate orientation using relative distances between multiple measured locations on the trailer 11 as measured by multiple sensors 30, 36 mounted at different locations on the vehicle 10.

To calculate the vehicle path 44 to the final position 42 the hitch assist system 12 must know the location of the vehicle hitch ball 20 and the trailer hitch 21. The controller 18 may use a coordinate system which is centered on the rear axle 46 of the vehicle 10. The vehicle hitch ball 20 may be a known distance from the rear axle 46. Alternatively, the controller 18 may calculate the location of the hitch ball 20 based on information from the camera 30 or sensors 36. Likewise, the location of the trailer hitch 21 may also be determined by the controller 18 based on information from the camera 30 and sensors 36. The position of the trailer hitch 21 can also be determined by marking the position with a position marking device 48. For example, the position marking device 48 may be a digital GPS or a keyfob for the vehicle 10. The position marking device 48 may be placed on the trailer hitch for the duration of moving from the initial position 40 to the final position 42, or the position marking device 48 may mark the trailer hitch 21 location at the outset of the maneuver and that marked location is used for the duration of the maneuver, e.g. the keyfob is placed back in the vehicle 10 after marking the trailer hitch 21 position and before the path following begins.

Referring to FIG. 2, there may be multiple trailers 11 detected by the hitch assist system 12. The input device 22 may provide an option to select which trailer 11 is intended for hitching. For example, by outlining the trailer 11 on a screen for the input device 22 and allowing the operator to select the appropriate trailer 11 by touching the intended trailer 11, or moving a cursor over the intended trailer 11 and selecting.

Figure 3:
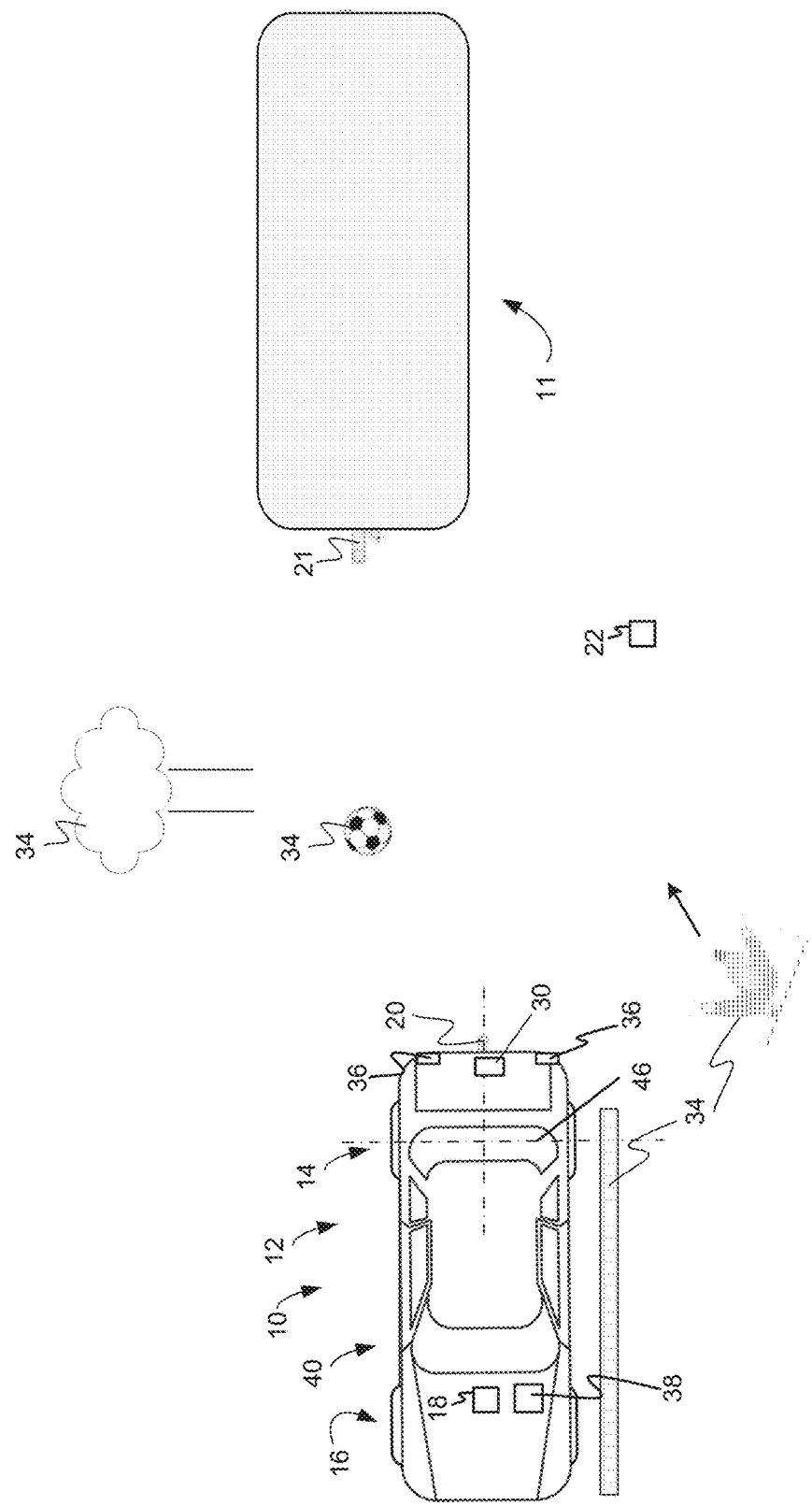
FIG. 3 is a schematic illustration showing a obstacle detection stage for the hitch assist system of FIGS. 1-2.

FIG. 3 illustrates an embodiment of the hitch assist system 12, which can assist the operator in monitoring the vehicle 10 and warning the operator and/or taking other action to avoid collision such as braking or steering around the object. Additionally, the hitch assist system 12 may limit the steering angle of the vehicle 10 to prevent the vehicle 10 from steering into the object. During reverse vehicle maneuvers front wheel off tracking occurs when the vehicle is steered through a curved trajectory. Therefore, objects 34 that do not appear like they will have a probable collision with the rear of the vehicle 10 may still be a problem for the side of the vehicle 10, limiting steering angle of the vehicle 10 can address this issue.

A further embodiment, the controller 18 includes instructions for detecting objects 34 proximate to the vehicle 10 with at least one of the sensors 36, camera 30 and GPS system 38. The controller 18 algorithm performs a probabilistic analysis of sensor-reported objects including fixed objects and moving pedestrians, expected and/or possible motion of a detected pedestrian, and the planned vehicle path. The objects identified proximate the vehicle are classified. Classification can include identifying if the object is fixed or moving and if moving at what speed and direction. The information obtained regarding the proximate objects is utilized to generate a predictive model of possible locations of a moving object at some future time. The predictive model can account for movement in view of the type of object, such as whether the object is a pedestrian walking or riding a bike. Movement of the pedestrian may also be predicted based on other identifying characteristics, such as whether the pedestrian is an adult or child.

The controller 18 executes an algorithm based on the predictive models of the vehicle path 40 and the object path 42. If a vehicle path and predicted pedestrian path (or a static object's position) intersects than a potential collision is indicated. Of all of the potential collisions that are detected, one will require intervention before the others, and that one will be acted upon.

The algorithm implements the following loop: predict all potential collisions; determine how confident we are that each detected collision will occur; determine which detected collision will require intervention first; and calculate the optimal response for the most relevant collision, e.g. braking for moving objects and steering around stationary objects. As the collision confidence changes, due to e.g. vehicle movement, object movement as the car is moving, the desired vehicle 10 response may also be changed. The controller 18 continually generates updated predictive models based on movement of the object 34 and the vehicle 10 to enable recalculation of the confidence number over the course of the backing maneuver. As the collision confidence changes, due to e.g. vehicle movement, object movement as the car is moving, the desired vehicle response may also be changed. The controller 18 for the hitch assist system 12 determines the collision confidence, while a separate controller may determine the desired braking rate, steering rate, etc. Alternatively, the same controller 18 may perform two or more functions.

Alternately, the operator can identify stationary objects 34 in a similar manner as selecting the trailer 11. The controller 18 can plot a path that avoids those objects 34. When any new or moving objects 34 are detected the hitch assist system 12 will stop the vehicle 10 motion until the object is removed. The hitch assist system 12 can then start moving again independently or when re-initiated by the user. Ultimately, the operator has the responsibility to ensure that there are no obstructions before requesting the automated hitching.

Figure 4:
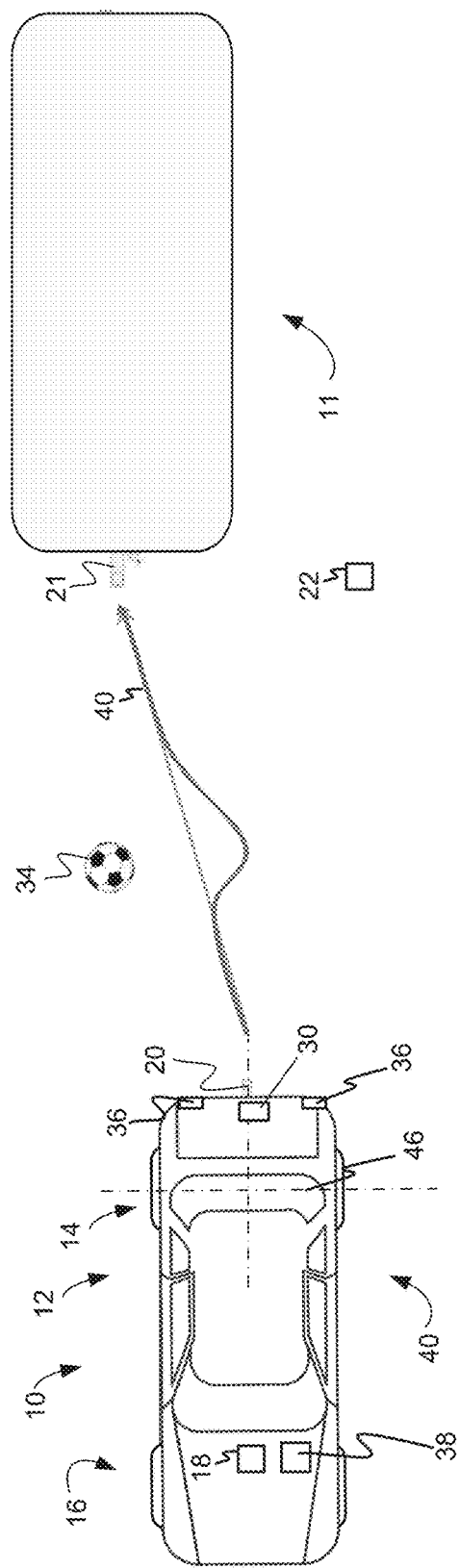
FIG. 4 is a schematic illustration showing a path calculation stage for the hitch assist system of FIGS. 1-3.

FIG. 4 illustrates controller 18 calculation of the vehicle path 40. As mentioned above, the path 40 can be calculated to avoid any objects 34. The controller 18 also determines the steering and braking required to move the vehicle 10 along the calculated path. Once the path is calculated the controller 18 sends instructions to the other vehicle systems 14, 16, 18, etc. to move the vehicle 10. In one example, the plotted path 40 may be shown virtually on the input device 22 allowing the operator to confirm prior to the vehicle 10 moving.

Further, the hitch assist system 12 may stop the vehicle 10 at an intermediate position, when the vehicle 10 is a predetermined distance away from the final position 42, e.g. when the vehicle is within 0.5-1.5 meters away. The operator can be asked to verify that the height of the hitch ball 20 is correct as compared to the trailer hitch 21. The predetermined distance for the intermediate position should be selected to make this visual comparison relatively easy for the operator. The trailer hitch 21 can be adjusted if necessary or an adjustable suspension system 16 for the vehicle 10 can be used to adjust the height of the hitch ball 20 to the desired height. Once the hitch 20, 21 height is confirmed the hitch assist system 12 may finish following the path 40 to the final position 42 (shown in FIG. 5).

FIG. 5 shows the vehicle 10 in the final position 42 after it has been moved by the hitch assist system 12. The hitch ball 20 should be aligned with the trailer hitch 21 such that the hitch can be locked in place without requiring further lateral adjustment of the vehicle 10. Vertical height adjustment of the hitch ball 20 or trailer hitch 21 can be performed as above either manually or with an adjustable suspension system 16. The hitch can be secured and the vehicle 10 and trailer 11 are secured for towing.

While the best modes for carrying out the invention have been described in detail the true scope of the disclosure should not be so limited, since those familiar with the art to which this invention relates will recognize various alternative designs and embodiments for practicing the invention within the scope of the appended claims.

What is claimed is:

1. A method of controlling a vehicle, the method comprising:
   initiating a trailer hitch assist system with an input device;
   detecting a trailer proximate to a vehicle with at least one sensor mounted to the vehicle;
   determining a vehicle hitch ball location;
   determining a trailer hitch location with a controller for a hitch assist system;
   calculating a vehicle path from an initial position to a final position with the controller;
   adjusting a hitch ball height with an adjustable suspension system of the vehicle before the final position, wherein the vehicle hitch ball is laterally aligned with the trailer hitch in the final position;
   calculating with the controller steering and braking maneuvers necessary to move the vehicle along the path to the final position; and
   sending instructions from the controller to a vehicle steering system and a vehicle brake system to perform the calculated steering and braking maneuvers.

2. The method as recited in claim 1, wherein determining a vehicle hitch ball location further comprises one of inputting to the controller with a position marking device and by performing image analysis with the controller on the image.

3. The method as recited in claim 1, further comprising:
   wherein the at least one sensor is a camera;
   detecting an object proximate to the vehicle path with one of the camera or another sensor for the vehicle; and
   sending instructions from the controller to perform a collision avoidance action.

4. The method as recited in claim 3, wherein detecting an object proximate to the vehicle path includes determining an offset of a front wheel path, from a rear wheel path based upon a steering angle of the vehicle of detecting any objects within that path, and sending instructions from the controller to perform at lease one collision avoidance action includes recalculating, by the controller, a new vehicle path with a limited steering angle to avoid the detected object.

5. The method of claim 4, wherein the at least one collision avoidance action is one of applying vehicle brakes of the vehicle brake system and recalculating a new vehicle path with the controller to avoid the detected object, then calculating the new steering and braking maneuvers necessary to move the vehicle along the new vehicle path and sending instructions from the controller to perform the new calculated maneuvers.

6. The method as recited in claim 1, wherein the input device is an independent wireless device.

7. The method as recited in claim 1, further comprising:
instructing the brake system to stop the vehicle when the controller determines the vehicle is at an intermediate position;
verifying relative height between the hitch ball and the trailer hitch with an operator input; and
sending instructions to the steering systems and brake systems to continue performing the calculated steering and braking maneuvers to the final position.

8. A hitch assist system for a vehicle, the hitch assist system comprising:
a camera mounted to view a reverse path of a vehicle;
an input device connected for the hitch assist system; and
a controller including instructions for:
detecting a trailer proximate to a vehicle with the camera;
determining a vehicle hitch ball location;
determining a trailer hitch location;
calculating a vehicle path from an initial position to a final position, wherein the vehicle hitch ball is laterally aligned with the trailer hitch in the final position;
instructing a brake system of the vehicle to stop the vehicle when the vehicle is at an intermediate position between the initial position and the final position;
verifying, at the intermediate position, a relative height between the hitch ball and the trailer hitch with an operator input;
calculating steering and braking maneuvers necessary to move the vehicle along the path to the final position; and
sending instructions to a vehicle steering system and the vehicle brake system to perform the calculated steering and braking maneuvers; and
an air suspension system configured to adjust the hitch ball height based on the verified relative height at the intermediate position.

9. The hitch assist system as recited in claim 8, further comprising a position marking device, wherein the vehicle hitch ball location is input to the controller with the position marking device.

10. The hitch assist system as recited in claim 8, wherein the controller includes further instructions for: detecting an object proximate to the vehicle path with one of the camera or another sensor for the vehicle; and sending instructions from the controller to perform a collision avoidance action.

11. The hitch assist system as recited in claim 10, wherein detecting an object proximate to the vehicle path includes determining an offset of a front wheel path, from a rear wheel path based upon a steering angle of the vehicle of detecting any objects within that path and the controller sends instructions to perform at least one collision avoidance action includes the controller recalculating a new vehicle path with a limited steering angle to avoid the detected object.

12. The hitch assist system of claim 11, the controller includes further instructions for determining the at least one collision avoidance action is one of:
applying the vehicle brakes with the vehicle brake system; and
recalculating a new vehicle path with the controller to avoid the detected object, then calculating the new steering and braking maneuvers necessary to move the vehicle along the new vehicle path and sending instructions from the controller to perform the new calculated maneuvers.

13. The hitch assist system as recited in claim 8, wherein the input device is an independent wireless device.

14. The hitch assist system as recited in claim 8, wherein the controller includes further instructions for:
sending instructions to the steering systems and brake systems to continue performing the calculated steering and braking maneuvers to the final position.

15. A method of controlling a vehicle, the method comprising:
providing a controller configured to provide signals for controlling steerable wheels of the vehicle via a powered steering system operatively coupled to the steerable wheels;
providing a driver input device in communication with the controller, the driver input device for receiving a directional input from a driver related to an intended direction of travel of the vehicle in reverse;
providing a camera for viewing a rear travelling path of the vehicle, the camera configured to capture images of the rear travelling path;
receiving, at the controller, the directional input from the driver comprising the intended direction of travel of the vehicle;
analyzing, by the controller, the one or more captured images to detect a trailer proximate to the vehicle;
determining, by the controller, a vehicle hitch ball location;
determining, by the controller, a trailer hitch position based on the one or more analyzed captured images;
calculating, by the controller, a vehicle path from an initial position to a final position based on the received directional input;
implementing, by the controller, a command to the powered steering system to steer the wheels from the initial position to the final position; and
implementing, by the controller, a command to an air suspension system to adjust a hitch ball height at an intermediate position between the initial position and the final position allowing the vehicle hitch ball to be laterally aligned with the trailer hitch in the final position.

16. The method of claim 15, further including:
verifying a relative height between the hitch ball and the trailer hitch with an operator input;
calculating the steering and braking maneuvers necessary to move the vehicle along the path to the final position; and
sending instructions to a vehicle steering system and a vehicle brake system to perform the calculated steering and braking maneuvers.

17. The method of claim 16, wherein determining a vehicle hitch ball location further comprises one of inputting to the controller with a position marking device and by performing image analysis with the controller on the image.

18. The method of claim 15, wherein the input device is an independent wireless device.

* * * * *